United States Patent [19]
Cordes et al.

[11] Patent Number: 6,047,722
[45] Date of Patent: Apr. 11, 2000

[54] PLURALITY OF SANITARY MIXER FITTINGS

[75] Inventors: Dieter Cordes, Nettetal; Werner Weinmann, Filderstadt, both of Germany; Günther Steger, Werfenweng, Austria

[73] Assignee: Hansa Metallwerke AG, Germany

[21] Appl. No.: 08/866,999

[22] Filed: May 30, 1997

[30] Foreign Application Priority Data

Jun. 4, 1996 [DE] Germany .......................... 196 22 368

[51] Int. Cl.$^7$ ................................................ F16K 11/074
[52] U.S. Cl. ........................................ 137/271; 137/625.4
[58] Field of Search .................................. 137/269, 271, 137/270, 625.4, 625.41

[56] References Cited

U.S. PATENT DOCUMENTS

| | | | |
|---|---|---|---|
| 5,095,934 | 3/1992 | Iqbal | 137/270 |
| 5,331,997 | 7/1994 | Bosio | 137/270 |
| 5,853,023 | 12/1998 | Orlandi et al. | 137/271 |

Primary Examiner—Kevin Lee

[57] ABSTRACT

A plurality of sanitary mixer fittings, in particular of concealed mixer fittings, form a set of mixer fittings that comprises identical universal connection housings with different cartridges and suitable different cartridges adapters. The universal housings have hot and cold water inlets for connection to the domestic water pipes as well as at least one mixed water outlet for connection e.g. to bath-tub inlets or showers. The relevant cartridge adapter is inserted into a location hole in the universal housings. The water inlets and outlets of the universal housings are flow-connected to water supply openings that are disposed in the inner surfaces of the adapter location hole in the universal housing. The water supply openings are flow-connected, optionally by annular chambers, to outer water supply openings in the outer surfaces of the relevant cartridge adapter. The relevant cartridge is inserted into a cartridge location hole in the relevant cartridge adapter. The water supply openings of the relevant cartridge are flow-connected to the inner water supply openings in the inner surface of the cartridge location hole of the relevant cartridge adapter. Provided in the relevant cartridge adapter are channels that connect the cartridge-side inner water supply openings of the cartridge adapter to the universal housing-side outer water supply openings of the cartridge adapter.

9 Claims, 10 Drawing Sheets

PLURALITY OF SANITARY MIXER FITTINGS

CROSS-REFERENCES TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates to a plurality of sanitary mixer fittings, in particular concealed mixer fittings.

2. Discussion of Relevant Art

With known sanitary mixer fittings of the type described initially, for each fitting and for each cartridge type the appropriate connection housings are manufactured and, in the case of concealed installation, inserted into a recess in a wall. Also known are adapter-like fitting parts which, in the case of so-called chaotic installation of the domestic plumbing, i.e. transposed domestic cold and hot water pipes, make it possible to compensate said transposition.

Thus, from EP 0 309 397 B1, for example, a water supply arrangement for a sanitary mixer fitting with a connection housing is known, which comprises connections for the domestic cold and hot water pipes as well as branch conduits. The latter are connected by nipples directly or via an adapter to the fitting housing. In the fitting housing there is a recess, into which an adapter for a cartridge of a conventional lever mixer may be introduced.

EP 0 309 397 B1 does indeed expressly mention that every known single- or multi-lever mixer may be used there. However, this does not mean that the realization of the technical teaching indicated here presupposes a plurality of fittings simultaneously offered by the manufacturer. In said publication there is no indication of the refinement of an overriding design principle for an entire set of fittings. Conveying of the flow from the cartridge to the fitting housing in said known arrangement is effected, in principle, via openings which are disposed in a plane surface in the fitting housing or in the distributor corresponding to the relevant fitting housing.

A use, or even a retrofitting of different cartridges with water supply openings arranged in any desired manner is not possible. This is a drawback also for the particular reason that the arrangement of water supply openings in cartridges as well as the shape of the cartridges themselves is not standardized and so there exists a large number of totally different cartridges which, e.g. given the arrangement described initially, cannot be used and/or retrofitted in any desired manner.

From EP 0 576 391 B1, moreover, a connection device for a sanitary mixer fitting is known, which comprises a connection housing with connections for cold and hot water and optionally for the mixed water outlet, to which a fitting housing may be fastened. Connection of the flow paths between connection housing and fitting housing is effected by a disc-shaped adapter, of which the surfaces of connection to the fitting housing, on the one hand, and to the connection housing, on the other hand, are plane. The purpose of said adapter is to enable a transposition of the hot and cold water connection to the connection housing to be compensated by a shift through 180°.

A particular drawback of said arrangement is that the water supply openings of the fitting housing have to be arranged point-symmetrically and so said arrangement too is restricted to the use of fittings with a specific arrangement of the water supply openings. Furthermore, the connection between the individual components is effected exclusively by plane surfaces. A direct adaptation for cartridges is not provided.

SUMMARY OF THE INVENTION

The object of the invention is therefore to provide a plurality of sanitary mixer fittings of the type described initially, which are suitable for receiving any and totally different types of mixer cartridges with different water supply openings and which consequently markedly reduce manufacturing costs.

Said object is achieved according to the invention by a plurality of sanitary mixer fittings having the features indicated in claim 1 a plurality of sanitary mixer fittings, in particular concealed mixer fittings, comprising a connection unit including a connection housing, a cartridge containing water-directing elements, and cartridge adapter provided in a water path from the connection housing to the cartridge, the plurality of sanitary mixer fittings forming a set of mixer fittings, the connection housings of the set of mixer fittings being identically designed as universal housings with identical adapter-side water supply openings, the cartridges of the set of mixer fittings differing from one another as regards their water supply openings, the cartridge adapters of the set being disposed directly between the universal housings and the cartridges, the adapters of the set of mixer fittings differing from one another, as regards inner water inlets and outlets to match water supply openings of the cartridges in the set of mixer fittings and having identical outer water inlets and outlets to match the adapter-side water supply openings of the universal housing.

The plurality of sanitary mixer fittings according to the invention is designed as a set of mixer fittings comprising a universal connection housing, different cartridges with corresponding operating elements and different adapters. The connection housing takes the form of a universal housing with connections for cold, hot and mixed water and with a location hole for the relevant adapter. The adapters are disposed as cartridge adapters directly between universal housing and the relevant cartridges and connect the water supply openings of the cartridges by way of channels to the water supply openings in the location hole of the universal housing. At their surfaces directed towards the universal housing, the cartridge adapters are designed in a standardized manner and, at their surfaces directed towards the relevant cartridges, they are designed specifically for each cartridge type. On the other hand, the universal housing is so constructed that the flow paths for cold water, hot water and mixed water from the connections for the domestic pipes open in the location hole for the cartridge adapters likewise in a standardized manner corresponding to the cartridge adapters.

A set of sanitary mixer fittings is therefore provided, which always have an identical and universal connection housing which, however, may receive differently shaped cartridges with any desired arrangement of water supply openings. The set of sanitary mixer fittings according to the invention may therefore embrace all types of mixer fitting such as, for example, single-lever or multi-lever mixers, thermostatic mixers, etc.

In particular, the low number of components and the possibility of manufacturing the universal housing in large piece numbers markedly reduces the manufacturing costs.

Conversions from one specific type of fitting to another are also easily possible at a later stage and may be effected extremely quickly. The low overall height also enables use even under spatially confined conditions.

A further advantage development according to the invention comprises a plurality of sanitary mixer fittings which form a set, wherein in each fitting of the set at least one of the flow connections between universal housing and the relevant cartridge adapter is effected via an annular chamber formed between the peripheral surface of the location hole of the universal housing and the peripheral surface of the cartridge adapter. A radially trouble-free installation of the cartridge adapter relative to the universal housing is thereby enabled without requiring any alignment of the corresponding openings.

A further advantage development of the invention comprises, in each mixer fitting of the set, an opening at the bottom of the relevant cartridge adapter, which opening connects the mixed water-carrying channel of the respective cartridge adapter to the mixed water outlet of the universal housing which opens likewise into an opening and/or into an annular chamber at the bottom of the location hole. By said means, pressure losses in the flow path of the mixed water are minimized.

A further advantage development of the invention comprises, in at least one mixer fitting of the set, a cartridge adapter which is so designed that the flow connection between cartridge adapter and cartridge is effected via openings in a plane surface of the cartridge adapter and/or cartridge. Said form of construction enables in particular the use of cartridges of single-lever and multi-lever mixers of the type which are currently widely used.

The development of the invention comprises, in at least one mixer fitting of the set, a cartridge adapter which is so designed that the flow connection between cartridge adapter and cartridge is effected via annular chambers formed in the cartridge location hole between cartridge adapter and cartridge. Said form of construction enables in particular the use of cartridges for thermostatic mixers or other cartridges which have axially offset water inlet and outlet planes, in which the water flow is effected radially.

A further advantage development of the invention comprises at least two cartridge adapters per cartridge type. The second cartridge adapter differs from the first in that conveying of the flow of hot water and cold water inside the cartridge adapter is transposed. By said means, it is possible to compensate a transposed connection of the domestic hot water and cold water pipes, such as may occur when installing the domestic pipes, by use of either one or the other cartridge adapter.

A further advantage development of the invention comprises radial seals which are introduced into annular grooves in the peripheral surfaces of the cartridge adapters. By said means, particularly when the flow connection between universal housing and the relevant cartridge adapter is effected by means of annular chambers, a reliable sealing of the flow paths is guaranteed and installation is facilitated.

A further advantage development of the invention comprises holes which are introduced into the universal housing of at least one set of mixer fittings in the flow paths between the hot water and cold water inlets and the relevant cartridge adapters. Maintenance units, such as, for example, screening devices, sound absorbers, preliminary stop valves, and other conventional accessories may be introduced into said holes.

A further advantage development of the invention comprises a particularly preferred embodiment of a cartridge adapter, in which the cartridge location hole is introduced centrally into the cartridge adapter so that a twisting of the cartridge adapter, e.g. for subsequent alignment of the sanitary mixer fitting, is possible without the relevant cartridge, and hence also the sanitary mixer fitting, shifting laterally.

BRIEF DESCRIPTION OF THE DRAWINGS

There follows a detailed description of embodiments of the invention with reference to the drawings. Said drawings show.

DETAILED DESCRIPTION OF THE PREFERRED EMBODIMENTS

Figure 1:
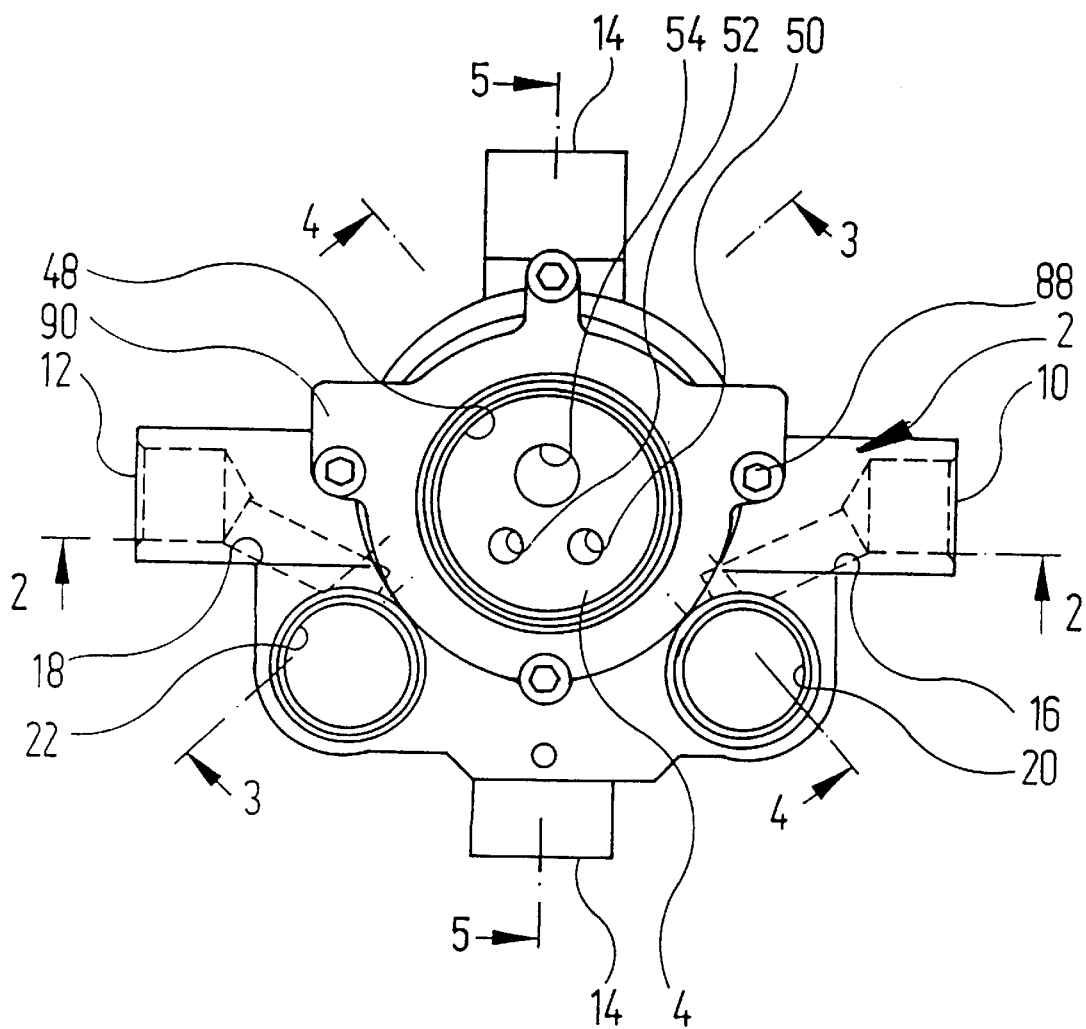
FIG. 1: a plan view of a first member of a set of sanitary mixer fittings, in which conveying of the water flows into and out of the cartridge is effected in an axial direction, only the connection unit being shown.

The connection unit shown in FIGS. 1 to 5 is used for the connection between the domestic pipes installed in the wall of a building and a cartridge 6, which is likewise part of said sanitary, single-lever, concealed mixer fitting and has water supply openings at its end face. The connection unit as a whole is provided with the reference numeral 1 and comprises a universal housing 2 and a cartridge adapter 4.

Visible on the right in FIG. 1 is the hot water inlet 10 of a domestic pipe to the universal housing 2, from which a first hot water branch conduit 16 leads to a stepped bore 20 for a hot water maintenance unit (not shown). Similarly visible on the left side of FIG. 1 is a cold water inlet 12 of the domestic pipe to the universal housing 2, from which a first cold water branch conduit 18 leads to a stepped bore 22 for a cold water maintenance unit (not shown). The cold water and hot water maintenance units may comprise preliminary stop valves and/or cleaning screens and/or sound absorbers etc. and as such are known. Mixed water outlets 14 are moreover visible at the top and bottom of FIG. 1, which outlets may be connected, for example, to a bath-tub inlet or a shower and are disposed on either side of the universal housing 2 (a mixed water outlet 14 which is not used is closable by means of a plug).

Formed in the universal housing 2 is a location hole 28 (not visible in FIG. 1) for the cartridge adapter 4, the cartridge adapter 4 being introduced into said hole. The cartridge adapter 4 in turn has a stepped cartridge location hole 48 as well as three inner water supply openings, namely an inner hot water opening 50, an inner cold water opening 52 and an inner mixed water opening 54, which all open into the bottom of the cartridge location hole 48. The cartridge adapter 4 is held in the adapter location hole 28 of the universal housing 2 by a pressing ring 90, which is fastened by screws 88 to the universal housing 2.

Figure 2:
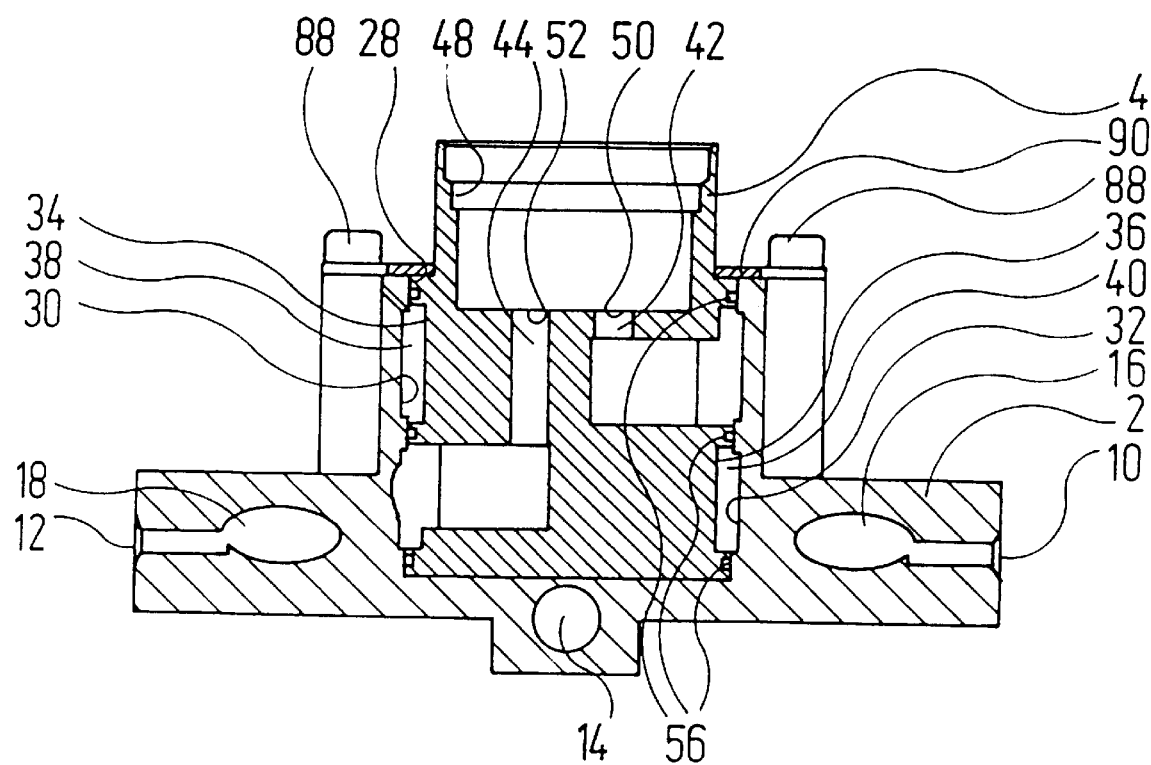
FIG. 2: a vertical section through the connection unit of FIG. 1 along the line 2—2, showing in particular the course of the flow in the cartridge adapter.
Figure 3:
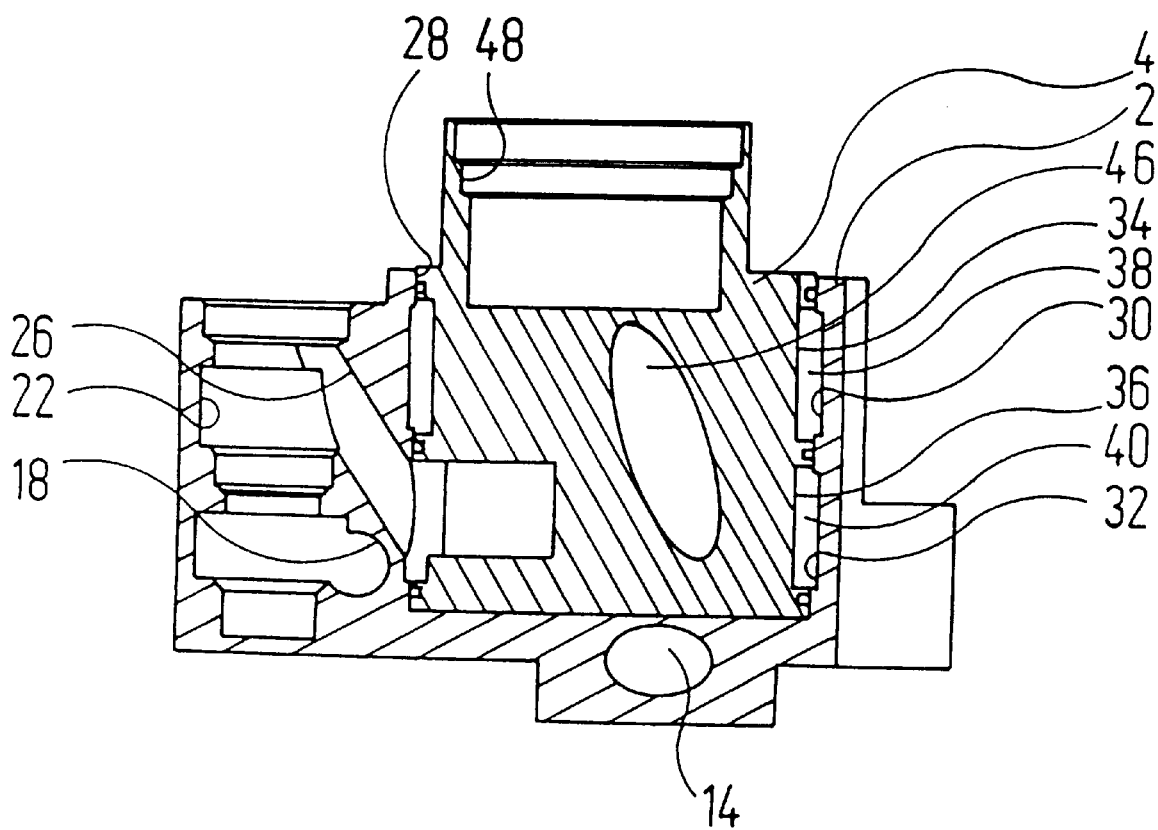
FIG. 3: a vertical section through the connection unit of FIG. 1 along the line 3—3, showing in particular the course of the cold water flow.

The cold water course is now explained with reference to FIGS. 2 and 3: From the stepped bore 22 in the universal housing 2 (see FIG. 3) for the cold water maintenance unit (not shown), a second cold water branch conduit 26 leads to a cold water annular groove 32 which is introduced into the peripheral surface of the adapter location hole 28 in the universal housing 2. Opposite the cold water annular groove 32 of the universal housing 2, a cold water annular groove 36 is introduced in the cartridge adapter 4 so that a cold water annular chamber 40 is formed. Emanating from the latter is a cold water adapter channel 44 (see FIG. 2) which opens at the inner cold water opening 52 into the bottom of the cartridge location hole 48. The cartridge adapter 4 is sealed off from the universal housing 2 by means of radial seals 56.

Figure 4:
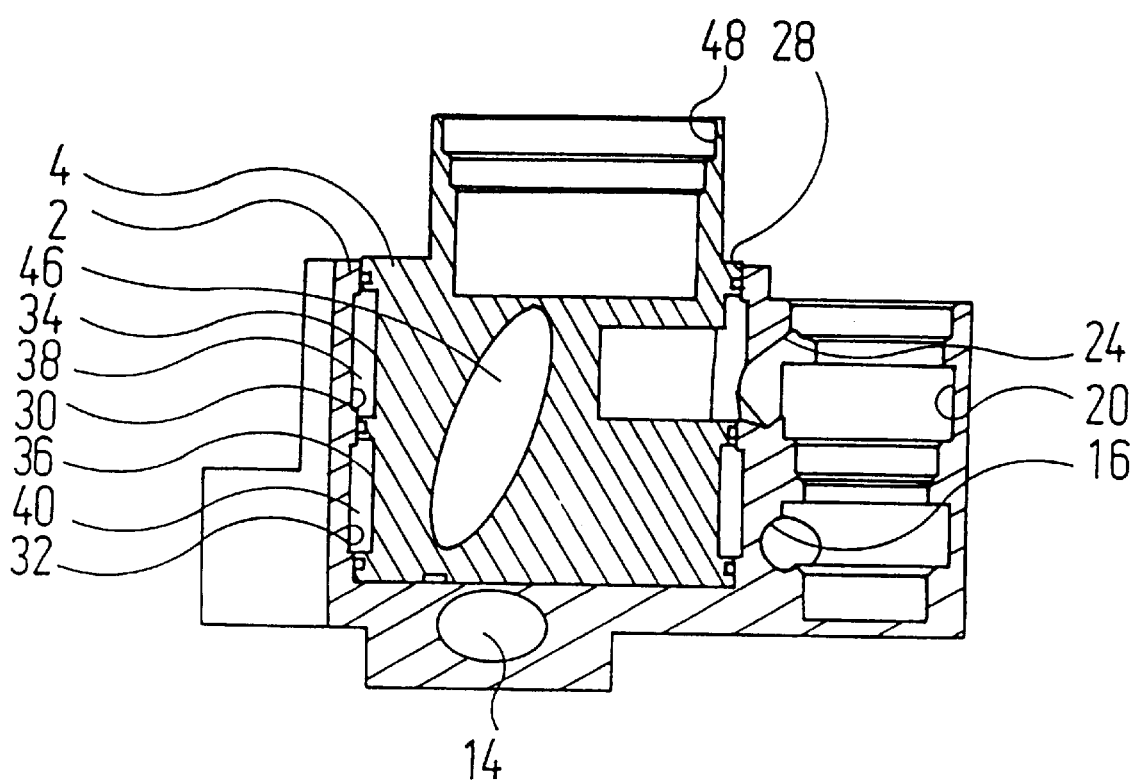
FIG. 4: a vertical section through the connection unit of FIG. 1 along the line 4—4, showing in particular the course of the hot water flow.

The hot water course is now explained with reference to FIGS. 2 and 4:

From the stepped bore 20 in the universal housing 2 (see FIG. 4) for the hot water maintenance unit, a second hot water branch conduit 24 leads to a hot water annular groove 30 which is formed in the peripheral surface of the adapter location hole 28, namely axially offset relative to the cold water annular groove 32. Introduced into the peripheral surface of the cartridge adapter 4 opposite the hot water annular groove 30 of the universal housing 2 is a hot water annular groove 34, from which a hot water adapter channel 42 (see FIG. 2) leads to an inner hot water opening 50 at the bottom of the cartridge location hole 48.

Figure 5:
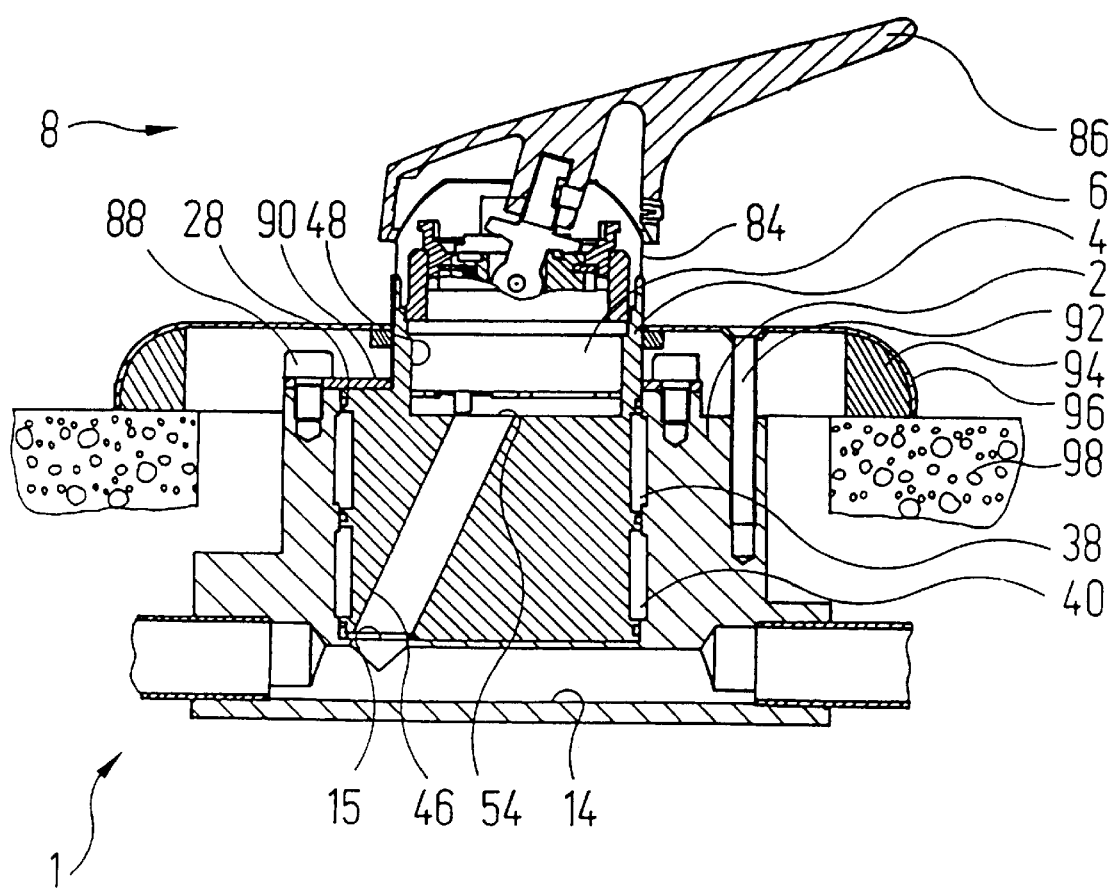
FIG. 5: a vertical section through the connection unit of FIG. 1 (with single-lever cartridge and operating handle) along the line 5—5, showing in particular the course of the mixed water flow.
Figure 6:
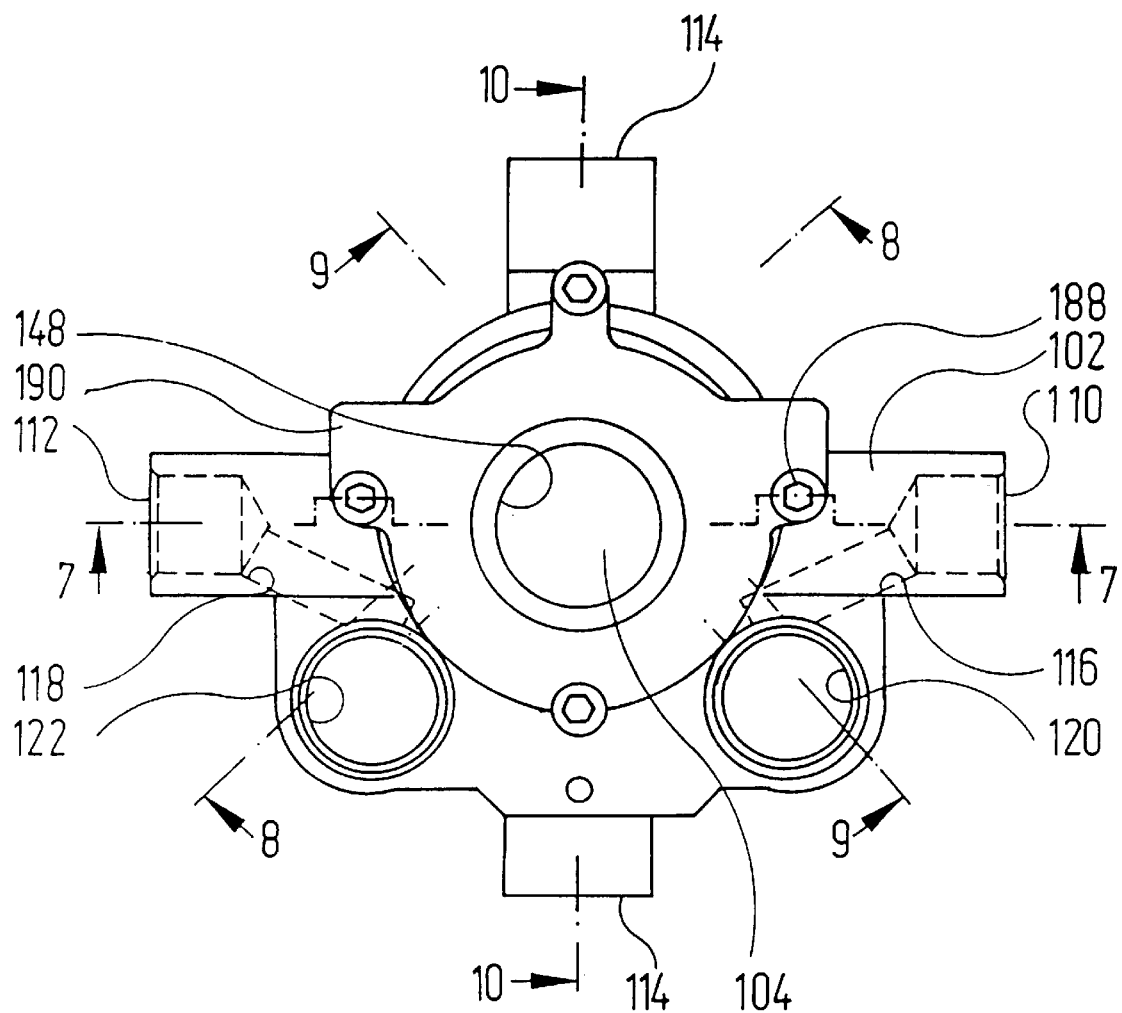
FIG. 6: a plan view of a second member of the set of sanitary mixer fittings, in which conveying of the water flows into and out of the cartridge is effected in a radial direction, only the connection unit being shown.

The course of the mixed water is evident from FIG. 5, the complete fitting 8 being shown in said Figure:

The fitting 8 consists of the connection unit 1, comprising universal housing 2 and cartridge adapter 4, as well as the cartridge 6, an operating handle 86 and a covering cap 84.

The cartridge 6 is introduced into the cartridge location hole 48 of the cartridge adapter 4. From the inner mixed water opening 54 at the bottom of the cartridge location hole 48 of the cartridge adapter 4, the mixed water is directed through the mixed water adapter channel 46 into the mixed water outlet 14 of the universal housing 2. The opening 15 to the mixed water outlet 14 at the bottom of the adapter location hole 28 of the universal housing 2 may be disposed in an annular groove (not shown), which is introduced coaxially relative to the adapter location hole 28 at the bottom of said location hole and hence forms an annular chamber between cartridge adapter 4 and universal housing 2.

The fitting 8 is introduced by the connection unit 1 into a recess of a wall 98 and covered by a round cover plate 96, which is fastened by means of screws 92 to the universal housing 2. The round cover plate 96 is sealed off from the wall 98 by insulation 94.

It is evident that the member of the set of sanitary mixer fittings shown in FIGS. 1 to 5 has a cartridge adapter 4 which is so designed that it presents a plane contact surface towards the cartridge 6 and that the flow connection between cartridge adapter 4 and cartridge 6 is effected via the water supply openings 50, 52, 54 which are disposed in one plane.

FIGS. 6 to 10 show a second member of the set of sanitary mixer fittings, which comprises a connection unit 101 for a cartridge 106, which differs from the cartridge 6 of the first member described in FIGS. 1 to 5 in that there is a radial flow against the water supply openings of the cartridge 106.

Corresponding parts are provided in FIGS. 6 to 10 with the same reference numerals as in FIGS. 1 to 5 plus 100.

The connection unit 101 comprises a universal housing 102 and a cartridge adapter 104. Since the design of the universal housing 102 is identical to that of the universal housing 2 in FIGS. 1 to 5, the universal housing 102 is not described again here.

This is not however the case with the cartridge adapter 104 used here.

Opposite the cold water annular groove 132 of the universal housing 102, an outer cold water annular groove 136 is introduced in the periphery of the cartridge adapter 104.

Figure 7:
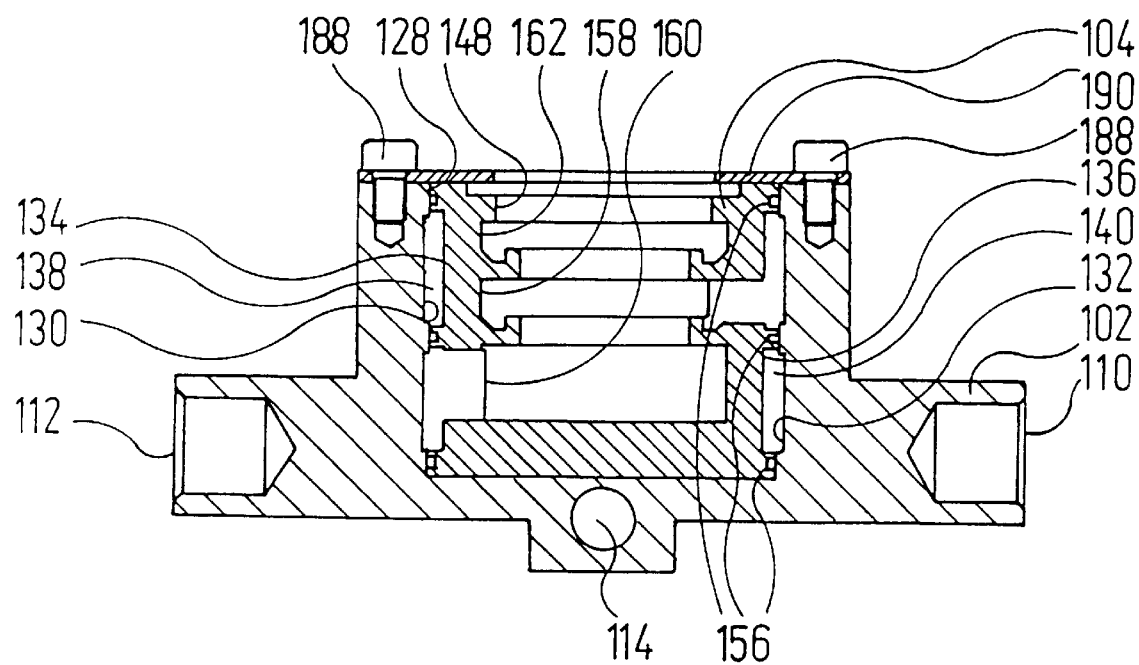
FIG. 7: a vertical section through the connection unit of FIG. 6 along the line 7—7, showing in particular the course of the flow in the adapter.
Figure 8:
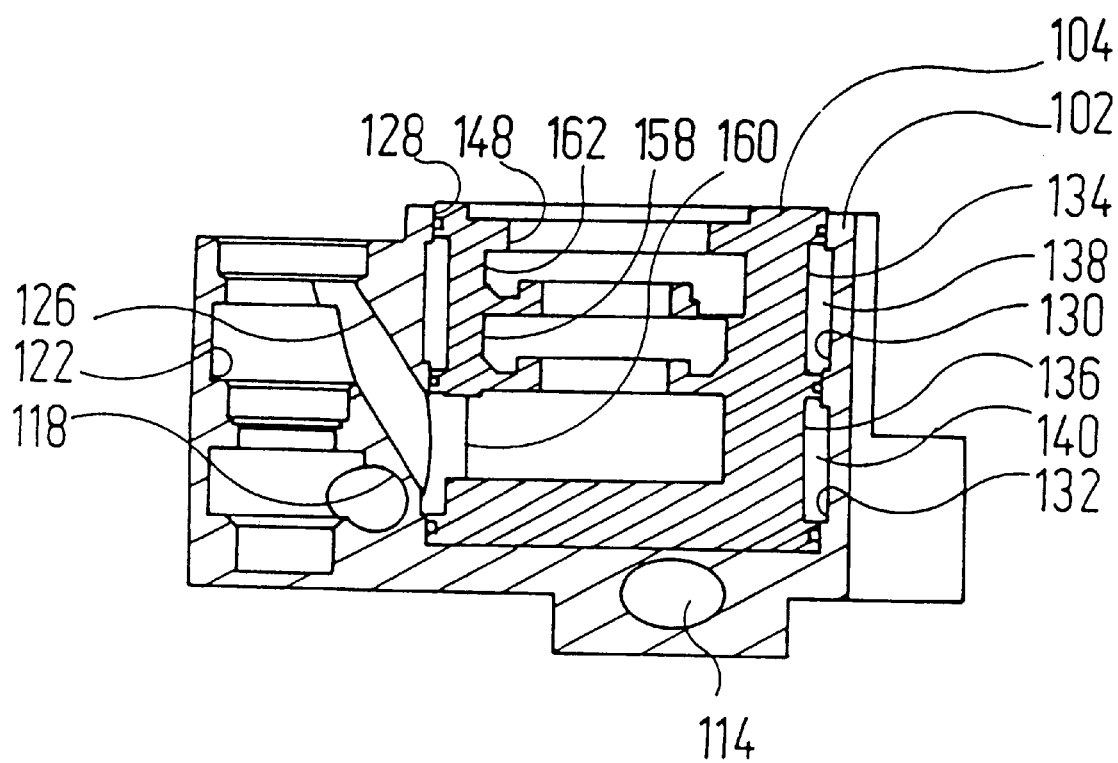
FIG. 8: a vertical section through the connection unit of FIG. 6 along the line 8—8, showing in particular the course of the cold water flow.

Said outer cold water annular groove 136 is flow-connected to an inner cold water annular groove 160, which is introduced in the inner peripheral surface of the cartridge location hole 148 of the cartridge adapter 104 (FIGS. 7 and 8). The annular grooves 132 and 136 form an outer cold water annular chamber 140.

Figure 9:
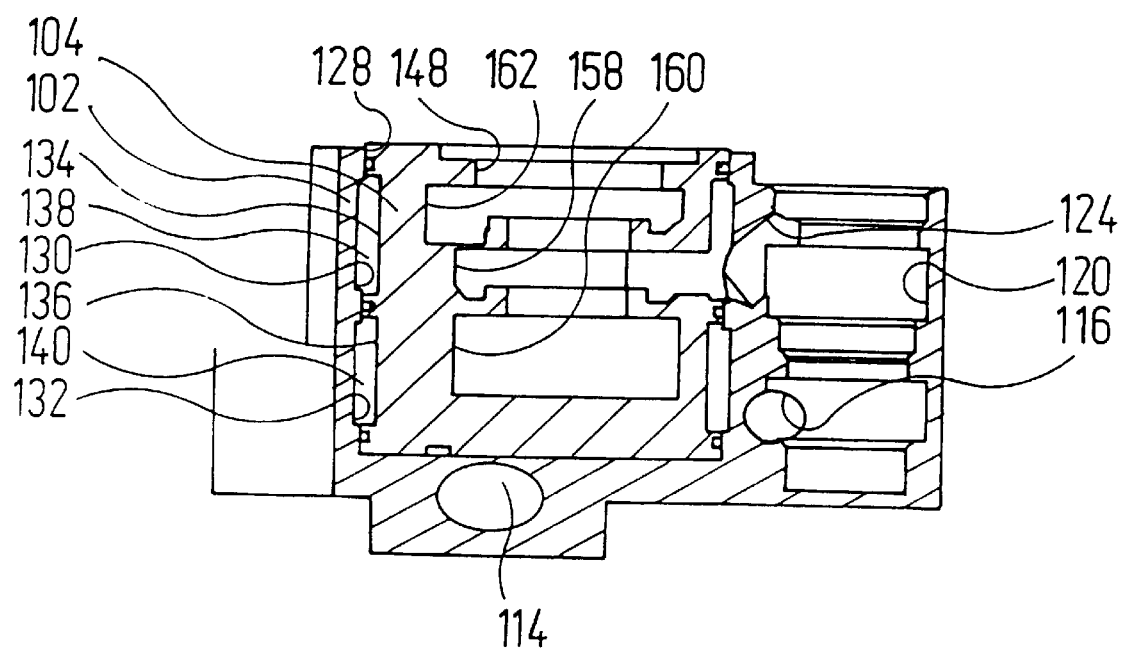
FIG. 9: a vertical section through the connection unit of FIG. 6 along the line 9—9, showing in particular the course of the hot water flow.

Opposite the hot water annular groove 130 of the universal housing 102 and axially offset relative to the outer cold water annular groove 136, an outer hot water annular groove 134 is introduced in the periphery of the cartridge adapter 104. Said outer hot water annular groove 134 is flow-connected to an inner hot water annular groove 158, which is introduced in the inner peripheral surface of the cartridge location hole 148 of the cartridge adapter 104 axially offset relative to the inner cold water annular groove 160 (FIGS. 8 and 9). The annular grooves 130 and 134 form an outer hot water annular chamber 138.

Figure 10:
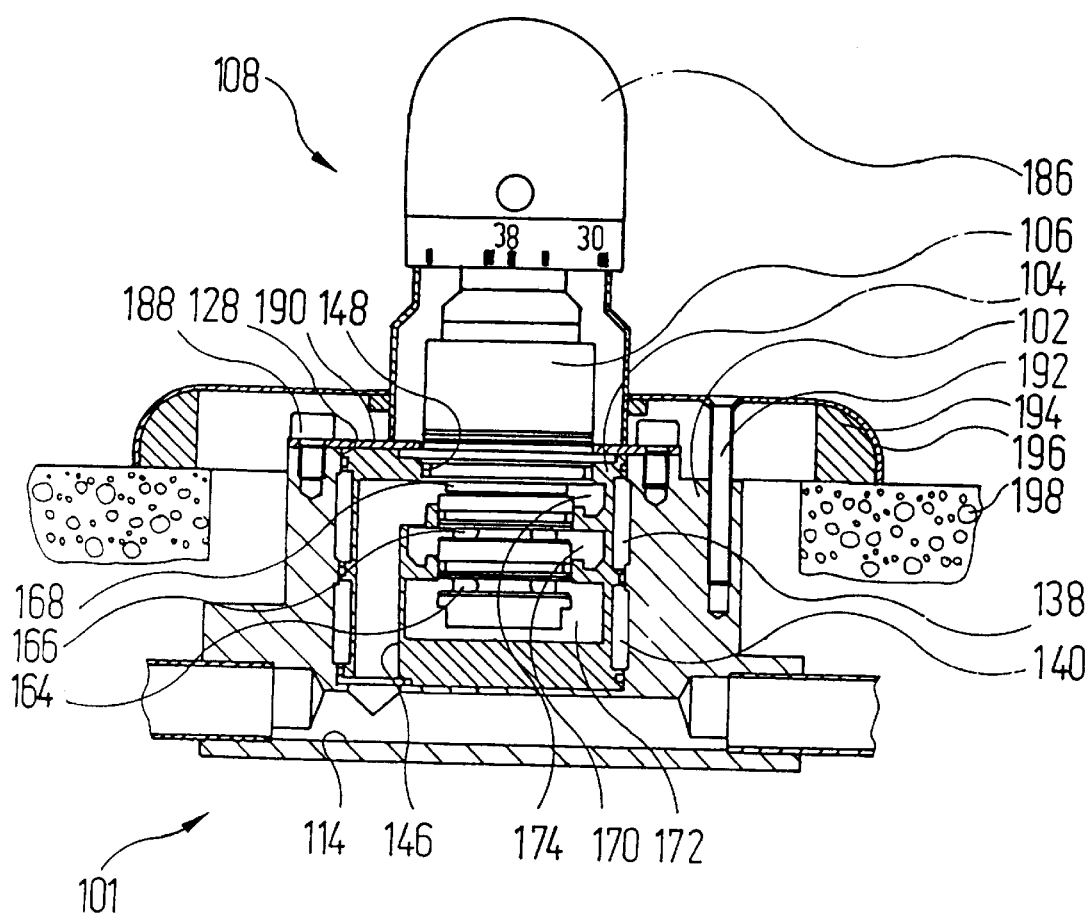
FIG. 10: a vertical section through the connection unit of FIG. 6 (with thermostatic cartridge and operating handle) along the line 10 —10, showing in particular the course of the mixed water flow.

In FIG. 10, the cartridge 106 of a thermostatic mixer fitting 108 is introduced into the cartridge location hole 148 of the cartridge adapter 104. In said cartridge 106, the water is supplied and removed radially by way of planes which are axially offset relative to one another. In other words, the supply of cold water to the cold water supply opening 164 of the cartridge 106 is effected via an inner cold water annular chamber 172 formed between the inner cold water annular groove 160 of the cartridge adapter 104 and the cartridge 106. The supply of hot water to a hot water supply opening 166 of the cartridge 106 is effected via an inner hot water annular chamber 170 formed between the inner hot water annular groove 158 of the cartridge adapter 104 and the cartridge 106. The removal of mixed water from a mixed water supply opening 168 of the cartridge 106 is finally effected via an inner mixed water annular chamber 174 formed between the inner mixed water annular groove 162 of the cartridge adapter 104 and the cartridge 106. The inner mixed water annular chamber 174 between cartridge adapter 104 and cartridge 106 is connected by a mixed water adapter channel 146 to the mixed water outlet 114 of the universal housing 102.

There now follows a description of the installation of the concealed mixer fittings 8; 108, which comprise the connection units 1; 101 and the cartridges 6; 106.

The universal housing 2; 102 is inserted into a recess in the wall 98; 198. The hot water inlet 10; 110 is connected to the domestic hot water pipe (not shown). The same applies to the cold water inlet 12; 112 and the mixed water outlets 14; 114.

Connections which are not required may be closed by means of plugs (not shown).

The cartridge adapters 4; 104 matching the respective cartridges 6; 106, having first been provided with the radial seals 56; 156, are inserted into the adapter location hole 28; 128 of the universal housing 2; 102 and pressed into the adapter location hole 28; 128 by the pressing ring 90; 190, which is fastened by the screws 88; 188 to the universal housing 2; 102.

Either suitable units (not shown) may be inserted into the stepped bores 20; 120 and 22; 122 for the hot and cold water maintenance units or said stepped bores may be closed by suitable plugs (not shown).

The appropriate cartridges 6; 106 are then inserted into the cartridge location hole 48; 148, the appropriate operating handles 86; 186 fastened and the appropriate cover elements and round cover plates 84, 96; 196 installed.

In summary, it is once more stressed:

The mixer fittings shown in FIGS. 1 to 5, on the one hand, and in FIGS. 6 to 10, on the other hand, are not different embodiments of an inventive concept which would be fully embodied in each of the two embodiments. Rather, the present invention presupposes a plurality of mixer fittings which are constructed as a set on the basis of an overriding design principle. Said design principle, for its representation, requires the description of at least two members of the set, as has been done above.

We claim:

1. A plurality of sanitary mixer fittings, comprising:

a connection unit including a connection housing, a cartridge containing water-directing elements, and a cartridge adapter provided in a water path from said connection housing to said cartridge, said plurality of sanitary mixer fittings (8; 108) forming a set of mixer fittings, connection housings of said set of mixer fittings comprising universal housings (2; 102) with identical adapter-side water supply openings, cartridges (6; 106) of said set of mixer fittings having water supply openings different from one another, cartridge adapters (4; 104) of said set of mixer fittings (8; 108) being disposed directly between said universal housings (2; 102) and said cartridges (6; 106), said cartridge adapters (4; 104) of said set of mixer fittings (8; 108) having inner water inlets and outlets different from one another to match water supply openings of said cartridges of said set of mixer fittings and having identical outer water inlets and outlets to match said adapter-side water supply openings of said universal housing.

2. Plurality of sanitary mixer fittings according to claim 1, characterized in that said universal housing includes a location hole having a peripheral surface and said cartridge adapters of said set of mixer fittings have peripheral surfaces, in each mixer fitting of said set of mixer fittings, at least one flow connection between said universal housing (2; 102) and a relevant cartridge adapter (4; 104) is effected via an annular chamber (38; 40; 138; 140) formed between said peripheral surface of said location hole (28; 128) of said universal housing (2; 102) and a peripheral surface of a relevant cartridge adapter (4; 104).

3. Plurality of sanitary mixer fittings according to claim 1, characterized in that, in each mixer fitting of the set of mixer fittings, a mixed water-carrying channel (46; 146) in a relevant cartridge adapter (4; 104) is connected by an opening at the bottom of said relevant cartridge adapter (4; 104) to a mixed water outlet (14; 114) of said universal housing (2; 102).

4. Plurality of sanitary mixer fittings according to claim 1, characterized in that, in at least one mixer fitting of said set of mixer fittings, a flow connection between said cartridge adapter (4) and said cartridge (6) is effected via openings (50, 52, 54) in a plane surface of said cartridge adapter (4).

5. Plurality of sanitary mixer fittings according to claim 1, characterized in that, said cartridge adapter includes a cartridge location hole, and in at least one mixer fitting of said set of mixer fittings, a flow connection between said cartridge adapter (104) and said cartridge (106) is effected via annular chambers (170, 172, 174) formed in said cartridge location hole (148) of said cartridge adapter (104) between said cartridge adapter (104) and said cartridge (106).

6. Plurality of sanitary mixer fittings according to claim 1, characterized in that said characterized in that said cartridges of said set of mixer fittings comprise a plurality of cartridge types and for each cartridge type (6; 106) at least two cartridge adapters (4; 104) are so designed that, depending on said cartridge adapter (4; 104), the flow course of hot water and cold water is transported so that a transposition of the domestic hot water and cold water pipes may be compensated.

7. Plurality of sanitary mixer fittings according to claim 1, characterized in that sealing of flow connections between said universal housings (2; 102) and said cartridge adapters (4; 104) of said set of mixer fittings is effected by radial seals (56; 156).

8. Plurality of sanitary mixer fittings according to claim 1, characterized in that said universal housings (2; 102) of said set of mixer fittings have stepped holes (20, 22; 120, 122) for receiving maintenance units comprising at least one of screening devices, sound absorbers and stop valves, which are disposed in a flow path between hot water and cold water inlets (10, 12; 110, 112) and relevant cartridge adapters (4; 104).

9. Plurality of mixer fittings according to claim 10, characterized in that, in at least one mixer fitting of said set of mixer fittings, a cartridge location hole (48; 148) is introduced centrally into said cartridge adapter (4; 104) so that a twisting of said cartridge adapter (4; 104) for subsequent alignment of said sanitary mixer fitting (8; 108) occurs without the latter being laterally displaced.

* * * * *